United States Patent [19]

Köller et al.

[11] Patent Number: 4,899,850
[45] Date of Patent: Feb. 13, 1990

[54] LUBRICATING DEVICE FOR A TURBOMACHINE

[75] Inventors: Walter Köller; Ludger Alfes, both of Staatsangehörigkeit, Fed. Rep. of Germany

[73] Assignee: Mannesmann Aktiengesellschaft, Düsseldorf, Fed. Rep. of Germany

[21] Appl. No.: 266,777

[22] Filed: Nov. 3, 1988

[30] Foreign Application Priority Data

Nov. 4, 1987 [DE] Fed. Rep. of Germany ....... 3737844

[51] Int. Cl.$^4$ ............................................. F01D 25/20
[52] U.S. Cl. .................... 184/6.3; 184/6.11; 184/212; 60/39.08
[58] Field of Search .................. 184/6.11, 6.3, 6.4, 184/27.1, 27.2; 417/390; 60/39.08

[56] References Cited

U.S. PATENT DOCUMENTS

| | | | |
|---|---|---|---|
| 1,647,135 | 11/1927 | Johnson | 184/6.4 |
| 2,245,175 | 6/1941 | Bany | 184/6.4 |
| 2,440,980 | 5/1948 | Sheppard | 184/6.3 |
| 2,711,071 | 6/1955 | Frankel | 60/39.08 |
| 3,472,024 | 10/1969 | Strub et al. | 60/39.08 |
| 3,658,153 | 4/1972 | Berman | 184/6.3 |
| 4,431,372 | 2/1984 | Dadhich | 184/27.2 |
| 4,446,377 | 5/1984 | Kure-Jensen et al. | 60/39.08 |
| 4,511,016 | 4/1985 | Doell | 60/39.08 |
| 4,629,033 | 12/1986 | Moore et al. | 184/6.3 |

Primary Examiner—Larry Jones
Attorney, Agent, or Firm—Horst M. Kasper

[57] ABSTRACT

The invention relates to a lubricating device for a turbomachine with a main oil pump mechanically connected to a central rotor shaft, which main oil pump exhibits an input port or, respectively, an output port which is connected for fluid with a suction line or, respectively, a discharge line, and including a hydraulically driven oil pump unit, including a motor and a pump, disposed in the region of the oil container, which oil pump unit pumps lubricating oil from the oil container via a main supply line to the consumer points. The motor of the oil pump unit is driven by the oil flowing out of the discharge line of the main oil pump, and the pump is mechanically driven by the motor, and withdraws oil from the oil container. In order to create such a device or apparatus, it is disclosed that the main oil pump (4) and the motor (11) of the oil pump unit (10), where the output port of the oil pump unit (10) is connected to the suction line (6) of the main oil pump (4), together with the lines (6, 8) form a closed circulation placed under pressure. The pump (12) of the oil pump unit (10) pumps oil into the main supply line (21). The suction line (6) of the main oil pump (4) exhibits a connection line (28) with a pressure regulator (25) to the main supply line (21), as well as a discharge line (24), provided with a baffle, and running to the oil container (9), are provided for the balancing of the leakage losses and for the discharge of the occurring friction load output.

21 Claims, 1 Drawing Sheet

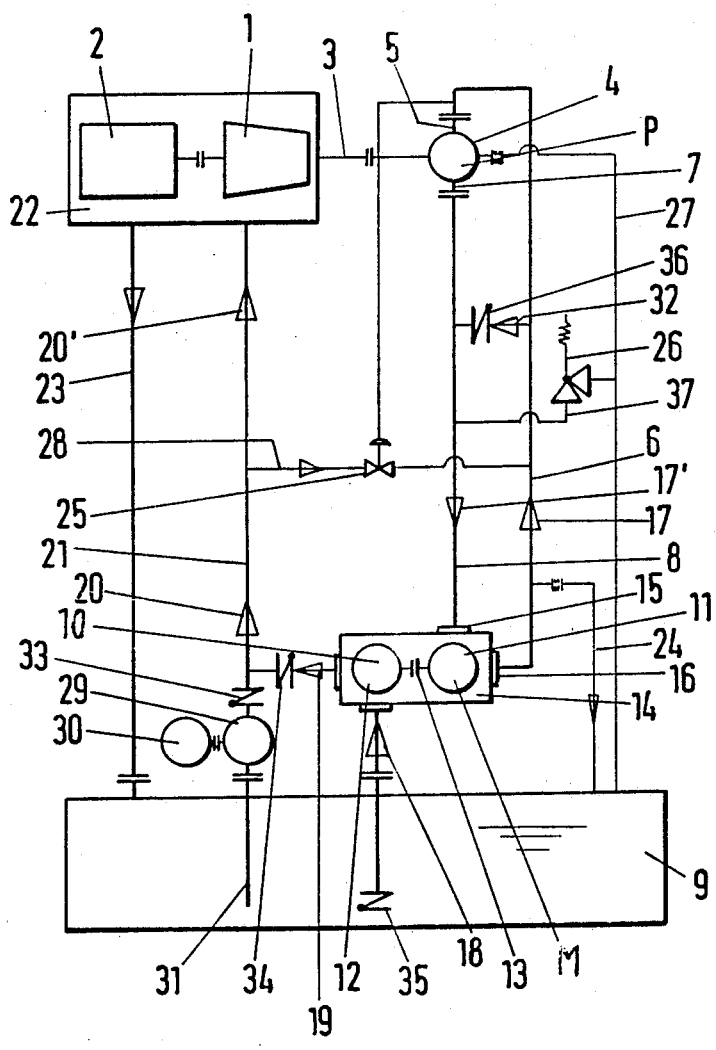

LUBRICATING DEVICE FOR A TURBOMACHINE

BACKGROUND OF THE INVENTION

1. Field of the Invention

The invention relates to a lubricating device for a turbomachine with a main oil pump mechanically connected to a central rotor shaft, which main oil pump includes an input port connected to a suction line and a discharge port connected to a discharge line, as well as an oil pump unit, disposed in the region of the oil container, and which oil pump unit is hydraulically driven and includes a motor and a pump, where the motor of the oil pump unit is driven by the oil flowing out of the discharge line of the main oil pump, where the pump is mechanically driven by the motor, and where the pump withdraws oil from the oil container.

2. Brief Description of the Background of the Invention Including Prior Art

A lubricating device of the above-recited kind is known from the German Patent Application Laid Open DE-OS 3,522,595. This lubricating device includes a centrifugal main pump, which centrifugal main pump is mechanically connected with the central rotor shaft of the turbo-engine. The oil of the centrifugal main pump, flowing through the discharge line, drives a booster pump disposed in the oil container, where the booster pump includes a booster turbine section and a booster pump section, where the booster pump section withdraws oil from the oil container and pumps the oil into a suction line of a centrifugal main pump. The oil flowing out of the booster turbine section is fed via a regulating valve to a main supply line. In order to bridge over the deficiency power or, respectively, the zero transport of the centrifugal main pump, upon falling off of a minimum rotation speed of the rotor shaft, an auxiliary pump is disposed in the oil container as a positive displacement pump. This auxiliary pump is driven by a separate motor and draws oil from the oil container and pumps the oil into the main supply line. This lubrication system is very expensive in its construction and it is complicated in its automatic control mechanism, since each interruption of the transport of the lubricating oil, upon falling below the required minimum rotation speed for the centrifugal main pump, has to be balanced in another way and since an auxiliary pump has to be installed for bridging the interrupted transport power. The drive of the auxiliary pump is dependent on the rotation motion of the central rotor shaft and uses additional energy.

SUMMARY OF THE INVENTION

1. Purposes of the Invention

It is an object of the invention to provide a lubricating system for a turbomachine, which is simpler and which provides the lubrication of consumer points of a turboset during all operating phases of the turbo-engine in a cost-advantageous way.

It is a further object of the present invention to provide a lubricating system for a turbomachine, which avoids failures based on disturbances in the rotation speed of the lubricating-oil transport pump.

It is yet another object of the present invention to provide a method of lubrication in a turbomachine, which avoids a requirement of an auxiliary pump, which uses additional energy based on a drive depending on the rotation motion of a central rotor shaft.

These and other objects and advantages of the present invention will become evident from the description which follows.

2. Brief Description of the Invention

The present invention provides for a lubricating device for a turbomachine. A main oil pump is mechanically connected to a central rotor shaft and has an input port and an output port. A suction line is connected to the input port of the main oil pump and a discharge line is connected to the output port of the main oil pump. A first connection line is connecting a main supply line with a pressure regulator. A second connection line is connecting the pressure regulator to the suction line. A third connection line is connecting the pressure regulator to the suction line. A suction discharge line is connecting the suction line to an oil container and provides for the balancing of the leakage losses and for removal of the heat fed to the oil by an occurring friction load output.

A hydraulically-driven oil pump unit can include a motor of the oil pump unit having an input port and a discharge port and disposed in the region of the oil container. The input port of the motor of the oil pump unit can be connected to the discharge line. Said discharge line in turn can be connected to the main oil pump. The the motor of the oil pump unit can be driven by the oil flowing out of the discharge line into the input port of the motor. The motor can be further connected to the suction line via the output port of the motor for removing oil from the motor thereby forming a closed hydraulic circuit under pressure.

An oil container withdrawal line can be connected to the oil container. A pump of the oil pump unit can be disposed in the region of the oil container. The pump can be mechanically connected to and driven by the motor. The pump can have an input port, which input port can be connected to the oil container withdrawal line. The pump can withdraw oil from the oil container and pump oil into the main supply line for supplying consumer points of the turbomachine. Preferably, a collection return line is connected to the oil container for returning collected oil discharged by consumer points of the turbomachine.

A measurement line can be connected to the discharge line. An overpressure safety valve can be connected to the measurement line for securing overpressure in the discharge line. A vent line can be connected to the main oil pump and to the oil container for venting the main oil pump and for feeding thereby transported oil to the oil container. The discharge line running to the oil container can include a baffle.

Preferably, the main oil pump is a pump operating according to a positive displacement principle. The pump and the motor of the oil pump unit can be provided as machines which operate either according to the positive displacement principle or the centrifugal force principle.

Preferably, the motor and the pump are disposed in the oil pump unit by two positive-displacement units formed as a gear pump and a gear motor of about equal size and about equal construction.

A discharge line-check valve connection line can connect the discharge line to a first check valve. A check valve - suction line connection line can connect the first check valve to the suction line for filling of a lubrication system between the suction line and the discharge line of the main oil pump. A second check valve can be disposed in the main supply line between the oil pump and the first connection line. A third check valve can be disposed in the oil container withdrawal line. A fourth check valve can connect the main supply line between the second check valve and the first connection line to the oil container.

The conventionally known lubricating systems are characterized in that either the oil container can be disposed only several meters, up to a maximum of at most 3 meters, below the level of the central rotor shaft and the therewith associated main oil pump. Or, alternatively, the transport power of the centrifugal main pump depends unfavorably and to a large extent on the rotation speed of the main shaft and has to be supported by auxiliary and/or additional pumps or, respectively, has to be replaced by auxiliary and/or additional pumps. All these disadvantages are avoided by the lubricating system according to this invention.

The oil pump unit, disposed on the oil container or, alternatively, disposed in the oil container, comprises a motor and a pump, which is mechanically connected to the motor. The oil pump unit draws oil from the oil container or oil bath and pumps it via the main supply line to the individual consumer points of the turboset. The oil pump unit includes a connecting casing surrounding the motor and the pump and two positive displacement devices, of preferably an identical size and identical construction, are advantageously provided in the connecting casing. The oil pump unit can be produced at low cost based on this constructive arrangement and the storage of replacement parts can be simplified.

The discharge of the motor is connected to the suction line of the main oil pump and forms a circulation of fluid under pressure together with the discharge line, which is connected to the input port of the motor and together with the main oil pump. The rotation speed of the motor and thus of the oil pump unit results from the delivery stream of the main oil pump. The pressure in the discharge line, secured by an overpressure safety valve or a pressure relief valve, is determined by the delivery pressure of the main oil pump. This delivery pressure is substantially reduced by the driving of the motor, where it is desired that an overpressure is still present at the discharge port of the motor. The automatic control for this purpose is provided by an automatic pressure controller or pressure-balance regulator, which is disposed in a connection line from the main supply line to the suction line of the main oil pump. It is thereby assured that at no position in the closed circulation between the main oil pump and the motor of the oil pump unit there is reached atmospheric pressure or where the pressure falls below atmospheric pressure. The bubble formation in the suction line, hitherto always considered critical, which can lead to cavitation damages at the main oil pump or, respectively, can result in a collapse of the oil transport, is thus avoided. The leakage losses in this circulation system, which are generated, on the one hand, by a vent line disposed at the main oil pump and, on the other hand, by the discharge line to the oil container, are also balanced through the connection line from the main supply line to the suction line of the main oil pump. This line, in addition, meets the requirement and purpose that continuously cooled oil, withdrawn from the oil container, is fed to the circulating oil and that heated oil is withdrawn from the circulation by the suction line of the main oil pump via a discharge line, and that the heated-up oil is fed back to the oil container. Thus, the generated friction load power heating, which result in an undesired heating-up of the oil in the circulating system, can be safely removed. The overpressure, continuously maintained in the circulation system, allows to dispose the oil container at a much lower level as was possible so far such that all construction technical advantages can be fully obtained in the positioning of foundations and of intermediate levels.

The lubricating system is filled with an auxiliary oil pump driven independent of the rotation motion of the turbomachine before the startup of the turbomachine. This auxiliary pump, which is also disposed close by the oil container, pulls oil from the oil container and fills the main supply line and thus feeds lubricating oil to all consumer points of the turboset. The circulating system is also filled by the connection line from the main supply line to the suction line and an additional connection line from the suction line to the discharge line of the main oil pump. The check valves and back-pressure valves, disposed in the lines, take care that in case of a pressure increase no undesired backflow of the lubricating oil occurs into a wrong direction. The main oil pump is, just like the machines of the oil pump unit, a gear pump. The gear pump has the advantage that, based on the steep delivery pressure characteristics, there is generated pressure in the discharge line immediately upon startup of the turboset and thus the motor of the oil pump unit is driven. The auxiliary oil pump can therefore be switched off at an early point in time, without that the lubrication of the consumer points of the turboset becomes endangered.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

In the accompanying drawing, in which is shown one of the various possible embodiments of the present invention:

FIG. 1 is a schematic diagram illustrating the invention lubrication system for a turbomachine.

DESCRIPTION OF INVENTION AND PREFERRED EMBODIMENT

According to the invention a lubricating device for turbomachine is provided with a main oil pump mechanically connected to a central rotor shaft. Said main oil pump includes an input port connected to a suction line and an output port connected to a discharge line, and a hydraulically-driven oil pump unit, including a motor and a pump, disposed in the region of an oil container. The motor of the oil pump unit is driven by the oil flowing out of the discharge line of the main oil pump. The pump is mechanically connected to and driven by the motor and withdraws oil from the oil container. The main oil pump 4 and the motor 11 of the oil pump unit 10, the output port of the oil pump unit 10, connected to the suction line 6 of the main oil pump 4, together with the lines 6, 8, are forming a closed circuit placed under pressure as a fluid. The pump 12 of the oil pump unit 10 pumps oil into the main supply line 21 to consumer points. The suction line 6 of the main oil pump 4 includes a connection line 28 with a pressure regulator 25 to the main supply line 21, as well as a discharge line 24, including a baffle to the oil container 9. Said suction line is provided for the balancing of the leakage losses and for removal of the heat fed to the oil by the occurring friction load output.

The main oil pump 4 can be a pump operating according to a positive displacement principle. The pump 12 and the motor 11 of the oil pump unit 10 can be provided as machines which operate either according to the centrifugal force principle or to the positive-displacement principle.

The motor 11 and the pump 12 can be disposed in the oil pump unit 10 by two positive-displacement units formed as a gear pump and a gear motor of about equal size and about equal construction.

A connection line 32, including a check valve 36, can be disposed for filling of the lubrication system between the suction line 6 and the discharge line 8 of the main oil pump 4.

A turboset is illustrated in a substantially simplified fashion in FIG. 1. The turboset comprises a turboengine 1 and a generator 2. The generator 2 drives the main oil pump 4 via a central rotor shaft 3. This main oil pump 4 includes an input port 5 connected with a suction line 6 and a discharge port 7, connected with a discharge line 8. An oil pump unit 10 is disposed close by an oil container 9. The oil pump unit 10 comprises a motor 11 and a pump 12. The two machines 11, 12 are connected to each other via a coupling 13 and are placed in a connecting casing 14 as a single unit. An input port 15 of the motor 11 is connected to the discharge line 8 of the main oil pump 4, and a discharge port 16 of the motor 11 is connected to the suction line 6 of the main oil pump 4. Thus, there results a fluid-circulation system under pressure between the main oil pump 4 and the motor 11 of the oil pump unit 10. The fluid direction of the fluid-circulation system is indicated by the arrows 17, 17'. The pump 12 of the oil pump unit 10 draws, as indicated by the arrow 18, oil from the oil container 9 and pumps the oil, as indicated by the arrows 19, 20, 20', into a main supply line 21. The oil flows from the main supply line 21 to the individual consumer points of the turboset, which are illustrated schematically in FIG. 1 by the surround 22 and via a collection return line 23 back into the oil container 9. Friction load outputs are generated in the circulation system during operation. The friction load outputs result in an undesired heating-up of the oil and, consequently, the heated-up oil has to be removed. A discharge line 24 is disposed for this purpose at the suction line 6. Warm oil is continuously withdrawn from the circulation system via the discharge line 24 and this warm oil flows into the oil container 9 for cooling purposes.

In order to avoid the presence of an atmospheric pressure or even underpressure in the suction line 6, based on a pressure drop caused by the drive of the motor 11, a pressure regulator 25 is disposed in a connection line 28. The desired overpressure in the suction line 6 can be controlled with this pressure regulator 25. Thus, the feared bubble formation in the suction line 6 is avoided and the main oil pump 4 is not destroyed by cavitation.

An overpressure safety valve 26 is disposed in a measurement line 37 branched off from the discharge line 8 for securing the overpressure in the discharge line 8. The venting of the main oil pump 4 is performed via a vent line 27, which feeds the thereby transported oil to the oil container 9. The leakage losses of the circulating system, caused on the one hand by the vent line 27 and, on the other hand, by the discharge line 24, are balanced through a connection line 28 between the main supply line 21 and the suction line 6. The cooled oil is fed through the circulating system via this line 28. The oil, warmed up in the circulating system through the friction losses, is fed away via the line 24, which contains a baffle.

The complete lubrication system is filled before the startup of the turboset via an auxiliary oil pump 29, disposed next to the oil container 9. This auxiliary oil pump 29 is driven by a drive 30 independent of the rotation speed of the turboset. The auxiliary oil pump 29 pulls, as indicated here by the arrow 31, oil from the oil container 9 and pumps it into the main supply line 21 such that all consumer points 22 of the turboset are fed with lubricating oil. The suction line 6 is also filled via the connection line 28, and a connection line 32 between the suction line 6 and the discharge 8 is provided for filling of the discharge line 8. Check valves 33, 34, 35, 36 are disposed in the various lines for avoiding an undesired flow-back of the oil in the wrong direction.

A method of lubricating a turbomachine comprises pulling oil with an auxiliary pump from an oil container, disposed close by a turbomachine, for filling a main supply line. The auxiliary pump is driven independently of the rotation motion of the turbomachine before a start-up of the turbomachine. Lubrication points of a turbomachine are filled with oil from the main supply line pumped by the auxiliary oil pump. The auxiliary pump is driven with a hydraulic gear motor connected with a discharge line to a main gear pump of the turbomachine, feeding oil to the hydraulic gear motor for generating pressure in the discharge line immediately upon start-up of the turbomachine for immediately driving the pump and for immediately feeding lubricant to lubrication points of the turbomachine.

Oil from said discharge line is fed via a check valve to the main supply line. The auxiliary pump is switched off upon full operation of the turbomachine for using a feeding of oil from the discharge line for lubricating the turbomachine.

It will be understood that each of the elements described above, or two or more together, may also find a useful application in other types of lubricating devices differing from the types described above.

While the invention has been illustrated and described as embodied in the context of a lubricating device for a turbomachine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A lubricating device for a turbomachine comprising
   a central rotor shaft;
   a main oil pump mechanically connected to the central rotor shaft and having an input port and having an output port;

a suction line connected to the input port of the main oil pump;

a discharge line connected to the output port of the main oil pump;

a main supply line;

a pressure regulator;

a first connection line connecting the main supply line with the pressure regulator;

a second connection line connecting the pressure regulator to the suction line;

a third connection line connecting the pressure regulator to the suction line;

an oil container;

a suction discharge line connecting the suction line to the oil container and provided for the balancing of the leakage losses and for removal of the heat fed to the oil by an occurring friction load output.

2. The lubricating device for a turbomachine according to claim 1 further comprising a hydraulically-driven oil pump unit including:

a motor of the oil pump unit having an input port and a discharge port and disposed in the region of the oil container, where the input port of the motor of the oil pump unit is connected to the discharge line, which discharge line in turn is connected to the main oil pump, and where the motor of the oil pump unit is driven by the oil flowing out of the discharge line into the input port of the motor, and where the motor is further connected to the suction line via the output port of the motor for removing oil from the motor thereby forming a closed hydraulic circuit under pressure.

3. The lubricating device for a turbomachine according to claim 2 further comprising oil consumer points of the turbomachine;

an oil container withdrawal line connected to the oil container;

a pump of the oil pump unit disposed in the region of the oil container, where the pump is mechanically connected to and driven by the motor, where the pump has an input port, which input port is connected to the oil container withdrawal line, and wherein the pump withdraws oil from the oil container, and where the pump pumps oil into the main supply line for supplying consumer points of the turbomachine;

a collection return line connected to the oil container for returning collected oil discharged by consumer points of the turbomachine.

4. The lubricating device for a turbomachine according to claim 3 further comprising a measurement line connected to the discharge line;

an overpressure safety valve connected to the measurement line for securing overpressure in the discharge line;

a vent line connected to the main oil pump and to the oil container for venting the main oil pump and for feeding thereby transported oil to the oil container.

5. The lubricating device according to claim 3, wherein the discharge line running to the oil container includes a baffle.

6. The lubricating device according to claim 3, wherein the main oil pump is a pump operating according to a positive displacement principle.

7. The lubricating device according to claim 3, wherein the pump and the motor of the oil pump unit are provided as machines which operate according to the positive displacement principle.

8. The lubricating device according to claim 3, wherein the motor and the pump are disposed in the oil pump unit by two positive-displacement units formed as a gear pump and a gear motor of about equal size and about equal construction.

9. The lubricating device according to claim 3 further comprising a first check valve;

a discharge line-check valve connection line connecting the discharge line to the first check valve;

a check valve - suction line connection line connecting the first check valve to the suction line for filling of a lubrication system between the suction line and the discharge line of the main oil pump.

10. The lubricating device according to claim 3 further comprising a second check valve disposed in the main supply line between the oil pump and the first connection line;

a third check valve disposed in the oil container withdrawal line;

a fourth check valve connecting the main supply line between the second check valve and the first connection line to the oil container.

11. The lubricating device for a turbomachine according to claim 3 further comprising a measurement line connected to the discharge line;

an overpressure safety valve connected to the measurement line for securing overpressure in the discharge line;

a vent line connected to the main oil pump and to the oil container for venting the main oil pump, with the main oil pump operating according to a positive displacement principle, and for feeding thereby transported oil to the oil container, and wherein the motor and the pump are disposed in the oil pump unit by two positive-displacement units formed as a gear pump and a gear motor of about equal size and about equal construction;

a baffle disposed in the suction discharge line running to the oil container;

a first check valve;

a discharge line-check valve connection line connecting the discharge line to the first check valve;

a check valve - suction line connection line connecting the first check valve to the suction line for filling of a lubrication system between the suction line and the discharge line of the main oil pump;

a second check valve disposed in the main supply line between the oil pump and the first connection line;

a third check valve disposed in the oil container withdrawal line;

a fourth check valve connecting the main supply line between the second check valve and the first connection line to the oil container.

12. The lubricating device according to claim 3, wherein the pump and the motor of the oil pump unit are provided as machines which operate according to the centrifugal force principle.

13. A lubricating device for a turbomachine comprising a central rotor shaft;

a main oil pump mechanically connected to the central rotor shaft and having an input port and an output port;

a suction line connected to the input port of the main oil pump;

a main supply line;

a discharge line connected to the output port of the main oil pump;

a connection line with a pressure regulator connected to the main supply line and to the suction line of the main oil pump, which are provided for the balancing of the leakage losses and for removal of the heat fed to the oil by a occurring friction load output;

an oil container;

a hydraulically-driven oil pump unit including:

a motor of the oil pump unit disposed in the region of the oil container, where the motor of the oil pump unit is connected to the discharge line connected to the main oil pump, and where the motor of the oil pump unit is driven by the oil flowing out of the discharge line;

a pump of the oil pump unit disposed in the region of the oil container, where the pump is mechanically connected to and driven by the motor, where the pump withdraws oil from the oil container, and where the pump pumps oil into the main supply line for supplying consumer points;

where the main oil pump and the motor of the oil pump unit, the output port of the oil pump unit connected to the suction line of the main oil pump, together with the discharge line, are forming a closed hydraulic circuit placed under pressure with a fluid.

14. The lubricating device according to claim 13 further comprising a suction discharge line disposed between the suction line and the oil container; a baffle disposed in the suction discharge line; wherein the main oil pump is a pump operating according to a positive displacement principle; and wherein the pump and the motor of the oil pump unit are provided as machines which operate either according to the centrifugal force principle or to the positive displacement principle; and wherein the motor and the pump are disposed in the oil pump unit by two positive-displacement units formed as a gear pump and a gear motor of about equal size and about equal construction;

a connection line including a check valve is disposed for filling of the lubrication system between the suction line and the discharge line of the main oil pump.

15. A lubricating device for turbomachine with a main oil pump mechanically connected to a central rotor shaft, which main oil pump includes an input port connected to a suction line and an output port connected to a discharge line, and a hydraulically-driven oil pump unit, including a motor and a pump, disposed in the region of an oil container, where the motor of the oil pump unit is driven by the oil flowing out of the discharge line of the main oil pump, and where the pump is mechanically connected to and driven by the motor, and where the pump withdraws oil from the oil container, characterized in that the main oil pump (4) and the motor (11) of the oil pump unit (10), the output port of the oil pump unit (10), connected to the suction line (6) of the main oil pump (4), together with the lines (6, 8), are forming a closed circuit placed under pressure as a fluid, and where the pump (12) of the oil pump unit (10) pumps oil into the main supply line (21) to consumer points, where the suction line (6) of the main oil pump (4), includes a connection line (28) with a pressure regulator (25) to the main supply line (21), as well as a discharge line (24), including a baffle to the oil container (9), which are provided for the balancing of the leakage losses and for removal of the heat fed to the oil by the occurring friction load output.

16. The lubricating device according to claim 15, wherein the main oil pump (4) is a pump operating according to a positive displacement principle.

17. The lubricating device according to claim 15, wherein the pump (12) and the motor (11) of the oil pump unit (10) are provided as machines which operate either according to the centrifugal force principle or to the positive-displacement principle.

18. The lubricating device according to claim 15, wherein the motor (11) and the pump (12) are disposed in the oil pump unit (10) by two positive-displacement units formed as a gear pump and a gear motor of about equal size and about equal construction.

19. The lubricating device according to claim 15, wherein a connection line (32), including a check valve (36), is disposed for filling of the lubrication system between the suction line (6) and the discharge line (8) of the main oil pump (4).

20. A method of lubricating a turbomachine comprising pulling oil with an auxiliary pump from an oil container, disposed close by a turbomachine, for filling a main supply line, and where the auxiliary pump is driven separately from the rotation motion of the turbomachine by a drive prior to start-up of the turbomachine; filling lubrication points of a turbomachine with oil from the main supply line pumped by the auxiliary oil pump; driving a pump unit with a hydraulic gear motor connected by a discharge line to a main gear pump, said main gear pump being driven by the turbomachine and feeding oil to the hydraulic gear motor for generating pressure in the discharge line immediately upon start-up of the turbomachine for immediately driving the pump unit and for immediately feeding lubricant to lubrication points of the turbomachine; and feeding oil from said main supply line directly to said main gear pump via a pressure regulator so that oil added to said discharge line flows through said main gear pump before the oil reaches said pump unit.

21. The method of lubricating a turbomachine according to claim 20 comprising feeding oil from said main supply line via a check valve from a suction line;

switching the auxiliary pump off upon full operation of the turbomachine and thereafter pumping oil from said oil container solely by means of said pump unit and supplying said oil to the main supply line for lubricating the turbomachine.

* * * * *